United States Patent
Yang et al.

(10) Patent No.: US 10,949,118 B2
(45) Date of Patent: Mar. 16, 2021

(54) DATA STORAGE METHOD, APPARATUS, AND DEVICE FOR MULTI-LAYER BLOCKCHAIN-TYPE LEDGER

(71) Applicant: Alibaba Group Holding Limited, George Town (KY)

(72) Inventors: Xinying Yang, Hangzhou (CN); Benquan Yu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/810,691

(22) Filed: Mar. 5, 2020

(65) Prior Publication Data

US 2020/0201560 A1  Jun. 25, 2020

Related U.S. Application Data

(63) Continuation of application No. PCT/CN2020/071455, filed on Jan. 10, 2020.

(30) Foreign Application Priority Data

Jun. 3, 2019  (CN) .......................... 201910475976.7

(51) Int. Cl.
*G06F 7/00* (2006.01)
*G06F 3/06* (2006.01)
(Continued)

(52) U.S. Cl.
CPC ............ *G06F 3/0655* (2013.01); *G06F 3/062* (2013.01); *G06F 3/0679* (2013.01); *G06Q 20/401* (2013.01); *H04L 9/32* (2013.01)

(58) Field of Classification Search
CPC ...... G06F 3/0655; G06F 3/062; G06F 3/0679; G06F 16/1805; G06F 16/27;
(Continued)

(56) References Cited

U.S. PATENT DOCUMENTS

2016/0191243 A1* 6/2016 Manning ................. H04L 9/321
                                                             713/168
2018/0278427 A1  9/2018 Thakore et al.
(Continued)

FOREIGN PATENT DOCUMENTS

CN       107612988       1/2018
CN       107657438       2/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Azam M Cheema
(74) *Attorney, Agent, or Firm* — Fish & Richardson P.C.

(57) ABSTRACT

Computer-implemented methods, non-transitory, computer-readable media, and computer-implemented systems for data storage. One computer-implemented method includes: obtaining a data block from a previous blockchain-type ledger in multi-level blockchain-type ledgers, where in the multi-level blockchain-type ledgers comprise a bottom-layer blockchain-type ledger and at least one higher-layer blockchain-type ledger; determining a block height of the data block and a root hash of a Merkel tree constructed by data records in the data block; constructing updated data records comprising the root hash and the block height; and recording the updated data records in a data block in a current blockchain-type ledger in the multi-level blockchain-type ledgers a level higher than the previous blockchain-type ledger.

21 Claims, 6 Drawing Sheets

(51) Int. Cl.
*H04L 9/32* (2006.01)
*G06Q 20/40* (2012.01)

(58) Field of Classification Search
CPC ... G06F 16/1834; G06F 16/13; G06Q 20/401; H04L 9/32; H04L 9/3239; H04L 9/0643
See application file for complete search history.

(56) References Cited

U.S. PATENT DOCUMENTS

| | | | |
|---|---|---|---|
| 2018/0316503 | A1 | 11/2018 | Cuende et al. |
| 2019/0034465 | A1* | 1/2019 | Shimamura ......... G06F 16/2474 |

FOREIGN PATENT DOCUMENTS

| | | |
|---|---|---|
| CN | 108039943 | 5/2018 |
| CN | 108304478 | 7/2018 |
| CN | 109241357 | 1/2019 |
| CN | 109299336 | 2/2019 |
| CN | 109299833 | 2/2019 |
| CN | 109447641 | 3/2019 |
| CN | 109658099 | 4/2019 |
| CN | 110347744 | 10/2019 |

OTHER PUBLICATIONS

Nakamoto, "Bitcoin: A Peer-to-Peer Electronic Cash System," www.bitcoin.org, 2005, 9 pages.

International Search Report and Written Opinion in PCT Appln No. PCT/CN2020/071455, dated Apr. 8, 2020, 20 pages (with English translation).

Shen et al, "Survey of Block Chain," in Chinese Journal of Network and Information Security, Nov. 2016, 10 pages (with English abstract).

Mubaslat, "Demonstrating the Functionality and Efficacy of Blockchain-based System in Healthcare Using Simulation Tools," in Browse all Theses and Dissertations, 2018, 132 pages.

* cited by examiner

DATA STORAGE METHOD, APPARATUS, AND DEVICE FOR MULTI-LAYER BLOCKCHAIN-TYPE LEDGER

CROSS-REFERENCE TO RELATED APPLICATIONS

This application is a continuation of PCT Application No. PCT/CN2020/071455, filed on Jan. 10, 2020, which claims priority to Chinese Patent Application No. 201910475976.7, filed on Jun. 3, 2019, and each application is hereby incorporated by reference in its entirety.

TECHNICAL FIELD

Implementations of the present specification relate to the field of information technologies, and in particular, to data storage methods, apparatuses, and devices for a multi-layer blockchain-type ledger that stores data based on a blockchain data structure (e.g., in a form of a blockchain).

BACKGROUND

In current blockchain-type ledgers, regardless of a decentralized blockchain ledger or a centralized blockchain-type ledger, generally, data is stored based on sub-ledgers. For record verifications, simplified payment verification (SPV) can be performed to verify existence of certain data records, or integrity verifications of data can be serially performed on an entire ledger.

To this end, a more effective data storage and verification solution is needed.

SUMMARY

An objective of implementations of the present application is to provide methods for implementing more effective data storage and verification for blockchain.

To resolve the previously described technical problems, the implementations of the present application are implemented as follows:

Some implementations of the present specification provide a data storage method for a multi-layer blockchain-type ledger, where the method is applied to a server that stores data by using one bottom-layer ledger and M higher-layer ledgers, both the bottom-layer ledger and the higher-layer ledger are blockchain-type ledgers, M is a natural number, and for the Kth higher-layer ledger ($1 \leq K \leq M$), the method includes: obtaining any data block in a previous ledger, where the previous ledger is the bottom-layer ledger when K=1, or the previous ledger is the (K−1)th higher-layer ledger when K>1; determining a block height of the data block, and determining a root hash of a Merkel tree including data records in the data block; constructing another data record including the root hash and the block height; and writing the another data record in a data block in the Kth higher-layer ledger.

Correspondingly, some implementations of the present specification further provide a data storage apparatus for a multi-layer blockchain-type ledger, where the apparatus is applied to a server that stores data by using one bottom-layer ledger and M higher-layer ledgers, both the bottom-layer ledger and the higher-layer ledger are blockchain-type ledgers, M is a natural number, and for the Kth higher-layer ledger ($1 \leq K \leq M$), the apparatus includes: an acquisition module, configured to obtain any data block in a previous ledger, where the previous ledger is the bottom-layer ledger when K=1, or the previous ledger is the (K−1)th higher-layer ledger when K>1; a determining module, configured to determine a block height of the data block, and determine a root hash of a Merkel tree including data records in the data block; a construction module, configured to construct another data record including the root hash and the block height; and a writing module, configured to write the another data record in a data block in the Kth higher-layer ledger.

According to another aspect, some implementations of the present specification further provide a data verification method based on the previously described multi-layer blockchain-type ledger, where the method is applied to a system including a client and a server, the server stores data by using one bottom-layer ledger and M higher-layer ledgers, both the bottom-layer ledger and the higher-layer ledger are blockchain-type ledgers, the client stores block header information in the blockchain-type ledgers, M is a natural number, and the method includes: sending, by the client, a verification instruction that includes a hash value of a data record to the server; determining, by the server based on the hash value, a Merkel path that needs to be provided by each ledger during verification, and generating a set including multiple pieces of Merkel path information, where each piece of Merkel path information includes a Merkel path provided by one ledger and a sequence number of the ledger; and receiving, by the client, the set including the multiple pieces of Merkel path information, and sequentially verifying Merkel paths based on the block header information and sequence numbers.

According to another aspect, some implementations of the present specification further provide a data verification system based on the previously described multi-layer blockchain-type ledger, where the system includes a client and a server, the server stores data by using one bottom-layer ledger and M higher-layer ledgers, both the bottom-layer ledger and the higher-layer ledger are blockchain-type ledgers, the client stores block header information in the blockchain-type ledgers, M is a natural number, and in the system: the client sends a verification instruction that includes a hash value of a data record to the server; the server determines, based on the hash value, a Merkel path that needs to be provided by each ledger during verification, and generates a set including multiple pieces of Merkel path information, where each piece of Merkel path information includes a Merkel path provided by one ledger and a sequence number of the ledger; and the client receives the set including the multiple pieces of Merkel path information, and sequentially verifies Merkel paths based on the block header information and sequence numbers.

According to the solutions provided in the implementations of the present specification, data is stored by using the multi-layer blockchain-type ledger. The bottom-layer ledger is a conventional ledger, and the higher-layer ledger stores data records each including a block height of a data block and a Merkel tree root hash of data records, so that one data block in the higher-layer ledger includes a large amount of information about the bottom-layer ledger. The higher-layer ledger is used for storage and verification, so that an information capacity of the data block in the ledger can be improved, and verification efficiency can be improved during verification.

It is worthwhile to understand that the previous general description and the following detailed description are merely illustrative examples, and cannot limit the implementations of the present specification.

In addition, any of the implementations of the present specification does not need to achieve all the previously described effects.

BRIEF DESCRIPTION OF DRAWINGS

To describe the technical solutions in the implementations of the present specification or in the existing technology more clearly, the following briefly describes the accompanying drawings required for describing the implementations or the existing technology. Clearly, the accompanying drawings in the following description merely show some implementations recorded in the implementations of the present specification, and a person of ordinary skill in the art can still derive other drawings from these accompanying drawings.

DESCRIPTION OF IMPLEMENTATIONS

To make a person skilled in the art understand the technical solutions in the implementations of the present specification better, the following describes the technical solutions in the implementations of the present specification in detail with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope.

Blockchain-type ledgers include a decentralized blockchain ledger and a centralized storage blockchain-type ledger. Regardless of which type of blockchain-type ledger is considered, generally, data records are stored by using a ledger, and a client can verify the data records.

In the implementations of the present specification, a method for storing data in a bottom-layer ledger and a higher-layer ledger is as follows: The ledger includes a block header and a block body, the block body stores data record information, and the block header stores related metadata information, such as a hash value of a previous data block and a root hash value of a Merkel tree including data records in a data block.

In such storage method, occupied space of the block header is far less than occupied space of the block body. Generally, the occupied space of the block header is less than 0.1% of the occupied space of the block body. Because a volume of the blockchain-type ledger is increasing, a client usually does not store full ledger information, but stores only block header information.

Based on the current data storage method, a current main verification method is simplified payment verification (SPV). In such verification method, a client serving as a light node does not need to store full ledger data, but only needs to store block header information in a ledger. During verification, a server (a full node in a blockchain ledger) only needs to return a corresponding Merkel path to the client.

Figure 1:
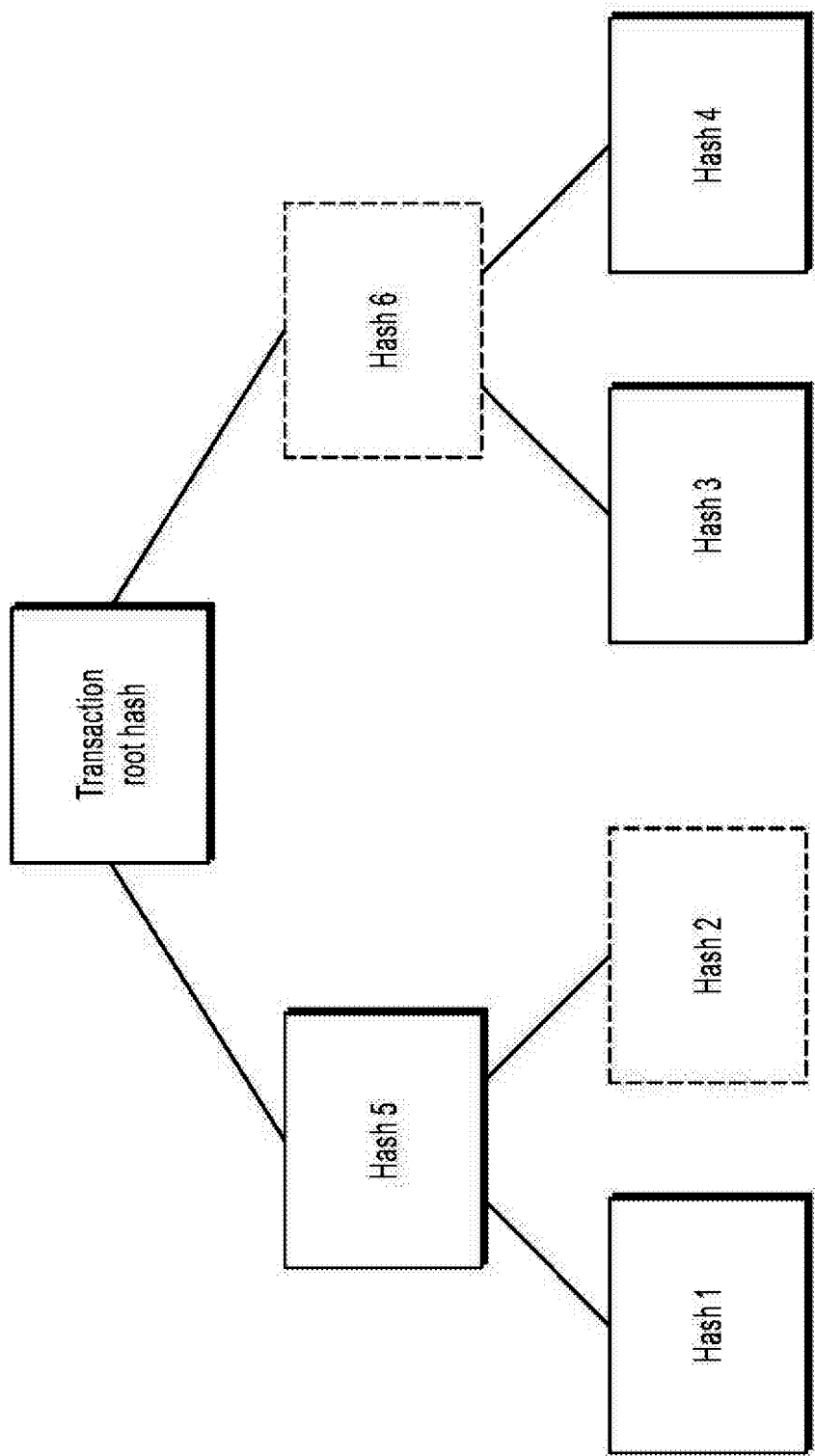
FIG. 1 is a schematic diagram illustrating a Merkel path in the existing technology.

FIG. 1 is a schematic diagram illustrating a Merkel path in the existing technology. As shown in FIG. 1, when a client needs to perform SPV on transaction 1, the client sends hash value hash1 of transaction 1 to a server. The server can find a corresponding data block based on hash value hash1 of transaction 1, and determine that a Merkel path needed for verifying transaction 1 is hash2 and hash6, so that the server returns hash2 and hash6 to the client. The client can perform calculation again based on hash2, hash6, and locally owned hash1 to obtain a Merkel tree root hash, and compare the Merkel tree root hash with a Merkel tree root hash in locally stored block header information, to verify whether transaction 1 exists in a ledger and whether transaction 1 changes.

During verification in such data storage method, the client actually verifies only one data record during SPV. Accordingly, the implementations of the present specification provide a data storage method for a multi-layer blockchain-type ledger, to improve an information capacity of a data block and efficiency during verification.

First, it is worthwhile to note that the solutions provided in the implementations of the present specification are performed based on a multi-layer blockchain-type ledger. The multi-layer blockchain-type ledger includes one bottom-layer ledger and M higher-layer ledgers, both the bottom-layer ledger and the higher-layer ledger are blockchain-type ledgers, and M is a natural number.

The bottom-layer ledger is a current conventional blockchain ledger or a blockchain-type ledger, one bottom-layer ledger includes multiple data blocks, and each data block includes a block header and a block body. User data is stored in block bodies of data blocks in the bottom-layer ledger in a form of data records. The block header stores related metadata information.

Figure 2:
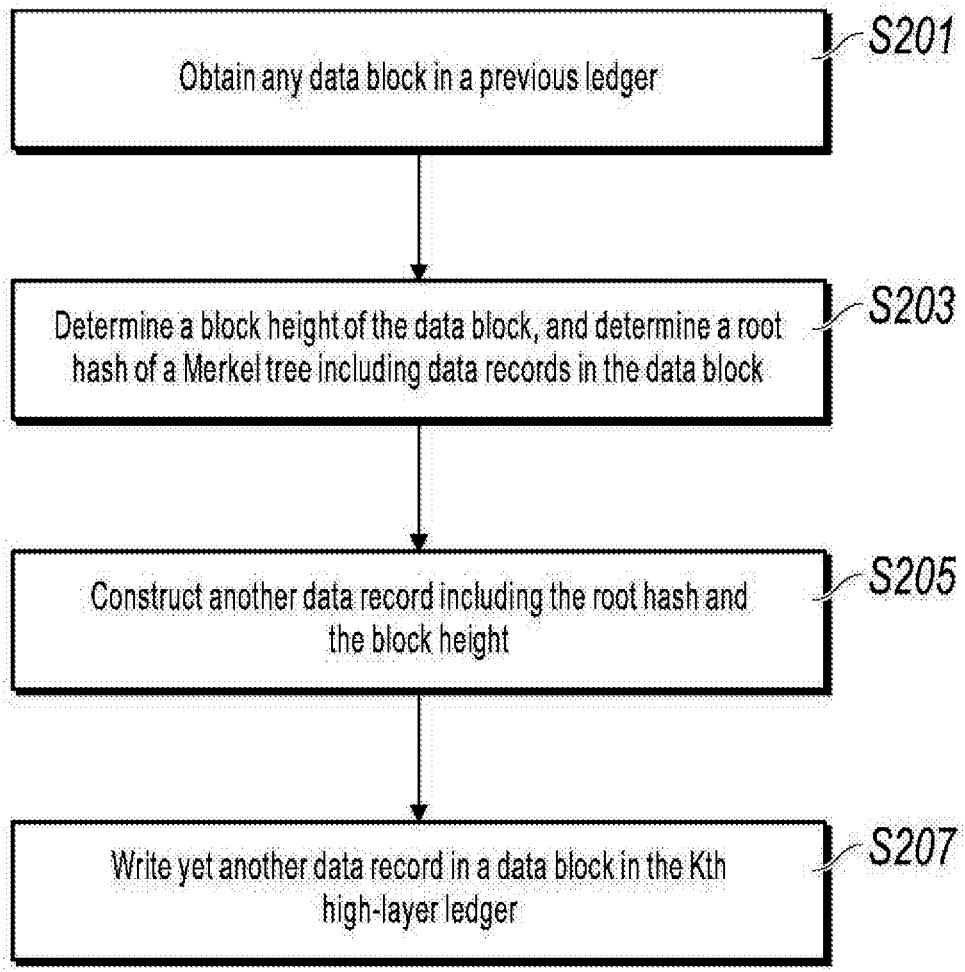
FIG. 2 shows a data storage method for a multi-layer blockchain-type ledger, according to some implementations of the present specification.

The technical solutions provided in the implementations of the present specification are described in detail below with reference to the accompanying drawings. FIG. 2 shows a data storage method for a multi-layer blockchain-type ledger, according to some implementations of the present specification. The process specifically includes the following steps.

S201. Obtain any data block in a previous ledger, where the previous ledger is a bottom-layer ledger when K=1, or the previous ledger is the (K−1)th higher-layer ledger when K>1.

Figure 3:
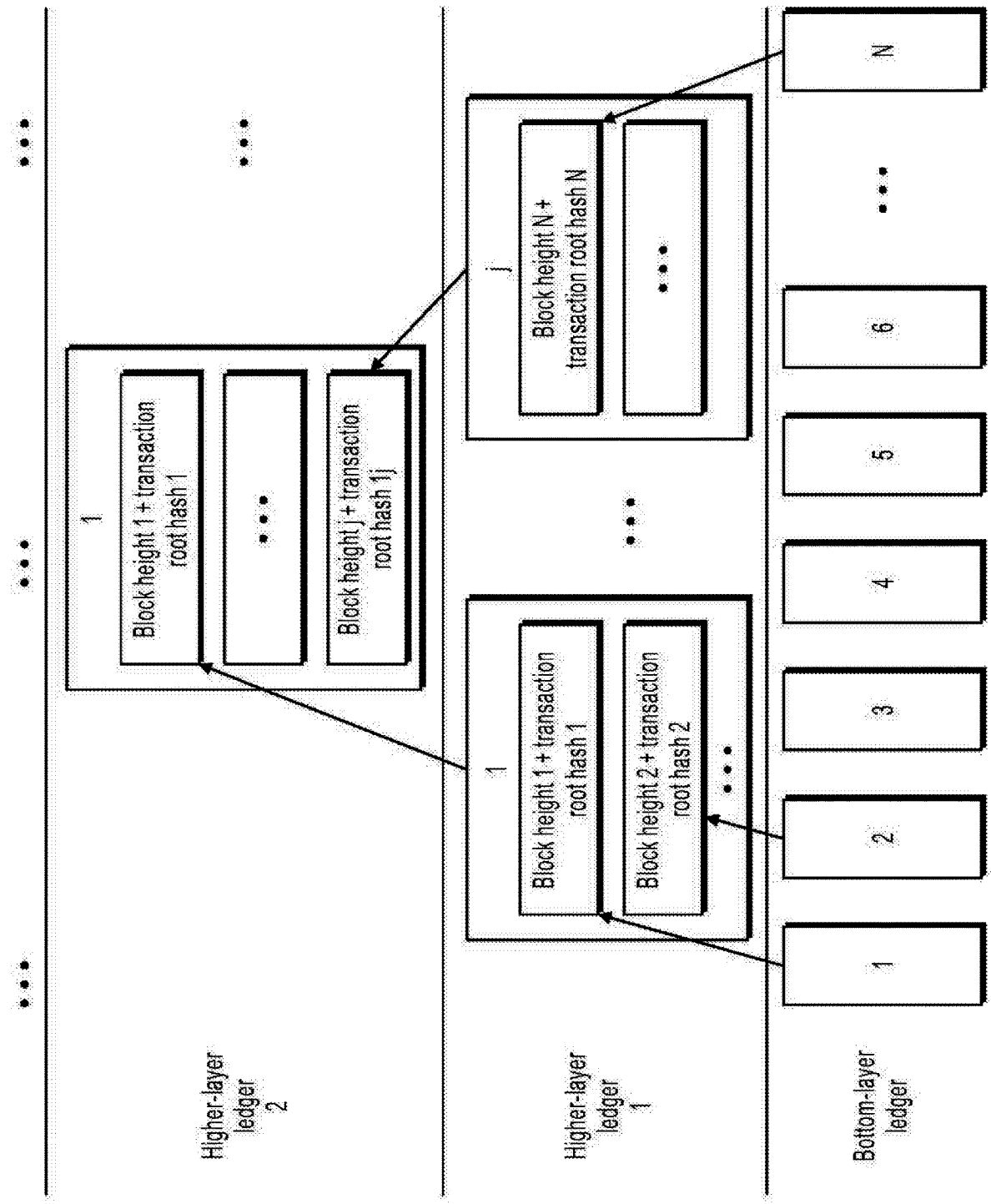
FIG. 3 is a schematic structural diagram illustrating higher-layer ledgers and a bottom-layer ledger, according to some implementations of the present specification.

As previously described, in this implementation of the present specification, the bottom-layer ledger is the same as a ledger in a conventional technology. Higher-layer ledgers compress information layer by layer as a chain. FIG. 3 is a schematic structural diagram illustrating higher-layer ledgers and a bottom-layer ledger, according to some implementations of the present specification.

Each higher-layer ledger has a previous ledger, that is, each higher-layer ledger has sequence number K, and a previous ledger of a higher-layer ledger with K=1 is the bottom-layer ledger.

Therefore, it can be determined that data stored in a higher-layer ledger is directly related to a data block in a previous ledger, but eventually is directly or indirectly related to a data record in the bottom-layer ledger.

Data blocks in the previous ledger can be obtained in an out-of-order way. In some implementations, the data blocks can be sequentially obtained based on a sequence of the data blocks in the previous ledger to generate data records of the higher-layer ledger.

S203. Determine a block height of the data block, and determine a root hash of a Merkel tree including data records in the data block.

The root hash of the Merkel tree including the data records in the data block can be obtained by querying a block header of the data block, or can be obtained by performing calculation again based on information in a block body of the data block.

S205. Construct another data record including the root hash and the block height.

Specifically, a construction method can be directly adding the root hash and the block height, that is, another data record=root hash+block height.

S207. Write yet another data record in a data block in the Kth higher-layer ledger.

As shown in FIG. 3, content of a data record in any higher-layer ledger includes a Merkel tree root hash of a transaction (briefly referred to as a transaction root hash in the figure) and a block height of a data block in a previous ledger. A specific quantity of layers of the higher-layer ledgers can be set based on an actual demand. Generally, one higher-layer ledger is sufficient to meet demands in most cases.

Figure 4:
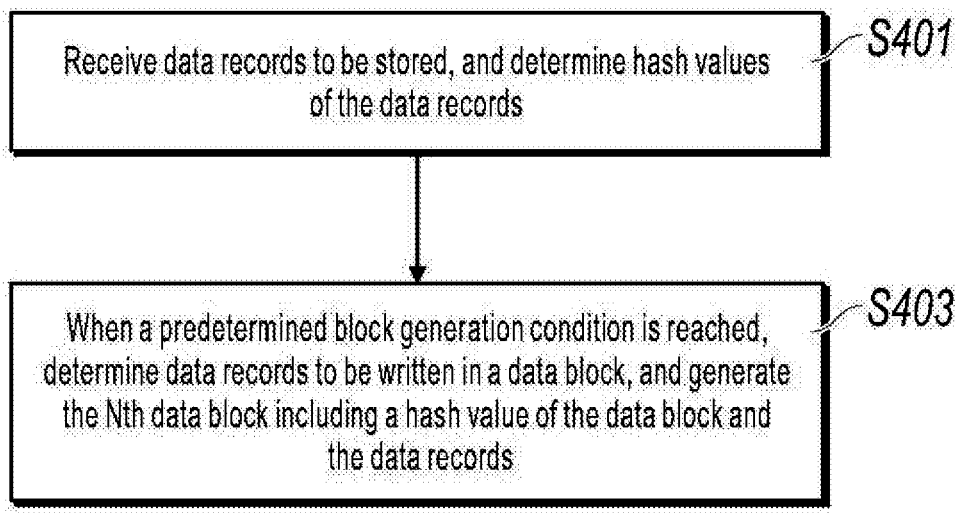
FIG. 4 is a schematic flowchart illustrating a method for generating a data block in a blockchain-type ledger, according to some implementations of the present specification.

In some implementations of the present specification, both the bottom-layer ledger and the higher-layer ledger are blockchain-type ledgers, including a blockchain ledger and a centralized blockchain-type ledger. In a centralized database server used in this implementation of the present specification, a data block in the blockchain-type ledger can be generated in the following way. FIG. 4 is a schematic flowchart illustrating a method for generating a data block in a blockchain-type ledger, according to some implementations of the present specification. The method includes the following steps.

S401. Receive data records to be stored, and determine hash values of the data records. The data records to be stored here can be spending records of a client-end personal user, or can be a service result, an intermediate state, an operation record, etc. generated when an application server executes service logic based on a user instruction. A specific service scenario can include a spending record, an audit log, a supply chain, a government supervision record, a medical record, etc.

S403. When a predetermined block generation condition is reached, determine data records to be written in a data block, and generate the Nth data block including a hash value of the data block and the data records.

The predetermined block generation condition includes: a quantity of data records to be stored reaches a quantity threshold. For example, a new data block is generated each time when one thousand data records are received, and the one thousand data records are written in the block. Alternatively, the predetermined block generation condition includes: a time interval from the last block generation time reaches a time threshold. For example, a new data block is generated every five minutes, and data records received in the five minutes are written in the block.

Here, N is a sequence number of the data block. In other words, in this implementation of the present specification, data blocks are arranged in a blockchain form based on a sequence of block generation times, and are ordered in time. A block height of the data block monotonously increases based on the sequence of the block generation times. The block height can be a sequence number, and in this case, a block height of the Nth data block is N. Alternatively, the block height can be generated in other ways. For example, a block generation timestamp of a data block is converted into monotonously increased large-scale data, and the large-scale data is used as a block height of the data block.

When N=1, the data block in this case is an initial data block. A hash value and a block height of the initial data block are given based on a predetermined way. For example, if the initial data block includes no data record, the hash value is any given hash value, and block height blknum=0. For another example, a trigger condition for generating the initial data block is consistent with a trigger condition for generating another data block, but the hash value of the initial data block is determined by performing hashing on all content in the initial data block.

When N>1, because content and a hash value of a previous data block have been determined, in this case, a hash value of the current data block (the Nth data block) can be generated based on the hash value of the previous data block (that is, the (N−1)th data block).

Specifically, a hash value of each data record to be written in the Nth data block can be determined, a Merkel tree can be generated based on a sequence of the data records in the block, a root hash value of the Merkel tree can be spliced with the hash value of the previous data block, and the hash value of the current data block is again generated by using a hash algorithm. Alternatively, the hash value of the current block can be generated based on the root hash value of the Merkel tree and some other metadata (such as a version number and a data block generation timestamp). In addition, the data records are written in a block body of the data block, and the root hash is written in a block header of the data block. A block height of the data block monotonously increases based on a sequence of block generation times.

According to the previously described data block generation method, each data block is determined by using a hash value, and the hash value of the data block is determined based on content and a sequence of data records in the data block and a hash value of a previous data block. A user can initiate verification at any time based on a hash value of a data block or hash values of data records. Modification to any content in the data block (including modification to content or a sequence of the data records in the data block) can result in inconsistency between a hash value of the data block obtained through calculation during verification and a hash value of the data block during data block generation, causing a verification failure. Therefore, tamper-resistance under centralization is implemented.

It is worthwhile to note that the previously described centralized blockchain-type ledger can be adapted to both the bottom-layer ledger and the higher-layer ledger.

After the multi-layer blockchain-type ledger is generated according to the previously described method, some implementations of the present specification further provide a data record verification method based on the previously described multi-layer blockchain-type ledger, where the method is applied to a system including a client and a server.

Figure 5:
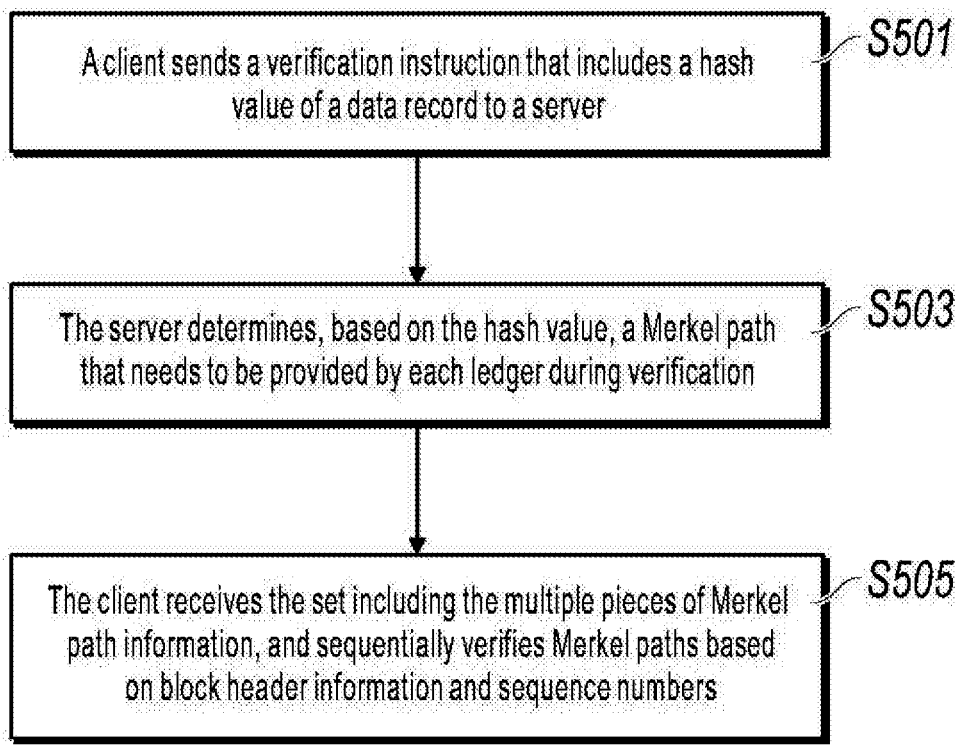
FIG. 5 is a schematic flowchart illustrating a data verification method based on a multi-layer blockchain-type ledger, according to some implementations of the present specification.

FIG. 5 is a schematic flowchart illustrating a data verification method based on a multi-layer blockchain-type ledger, according to some implementations of the present specification. The method includes the following steps.

S501. The client sends a verification instruction that includes a hash value of a data record to the server.

First, it is worthwhile to note that, in this implementation of the present specification, the client is a light node, that is, the client stores block header information of a bottom-layer ledger and higher-layer ledgers. The server is a full node that stores full information of the bottom-layer ledger and the higher-layer ledgers.

S503. The server determines, based on the hash value, a Merkel path that needs to be provided by each ledger during verification, and generates a set including multiple pieces of Merkel path information, where each piece of Merkel path information includes a Merkel path provided by one ledger and a sequence number of the ledger.

An index table including hash values and location information of data records can be first established in the server, and the index table can further include ledger virtual heights corresponding to the hash values, as shown in Table 1. In Table 1, sequence number "0" indicates the bottom-layer ledger, sequence number "2" indicates the second higher-layer ledger, and location information (2, 10) indicates the tenth data record in a data block whose block height is 2. The index table can correspond to both the bottom-layer ledger and the higher-layer ledgers.

TABLE 1

| Hash value | Sequence number | Location information |
|---|---|---|
| Hash1 | 0 | (2, 10) |
| Hash2 | 2 | (3, 100) |
| ... | ... | ... |

According to the index table, the server can quickly find, based on a hash value, a corresponding data record (the data record is in the bottom-layer ledger) and a data block including the data record. In addition, it is worthwhile to note that, when there is no index table, the server at least can obtain a data record corresponding to a hash value by traversing the ledger.

After the data record corresponding to the hash value in the bottom-layer ledger and a data block including the data record are determined, a corresponding Merkel path in the bottom-layer ledger, namely, a bottom-layer Merkel path, can be first determined, where a sequence number of the bottom-layer Merkel path is 0. In addition, a Merkel tree root hash can be obtained from a block header of the data block, or a Merkel tree root hash can be obtained by performing calculation again based on data records in the data block.

Then, according to a method the same as the previously described method for constructing the another data, the server can construct data record data1 including a block height and a Merkel tree root hash of the data block, and obtain a hash value hash (data1) of data record data1, namely, another hash value, through calculation. It is easy to understand that, according to the previously described method for constructing a data record in the higher-layer ledger, a data record corresponding to the hash (data1) in the first higher-layer ledger and a data block including the data record corresponding to the hash (data1) in the first higher-layer ledger can be obtained based on the another hash value through querying (by querying the previously described index table or through traverse querying). Therefore, the first higher-layer Merkel path required for verifying the data record corresponding to the hash (data1) can be obtained from the data block.

Figure 8:
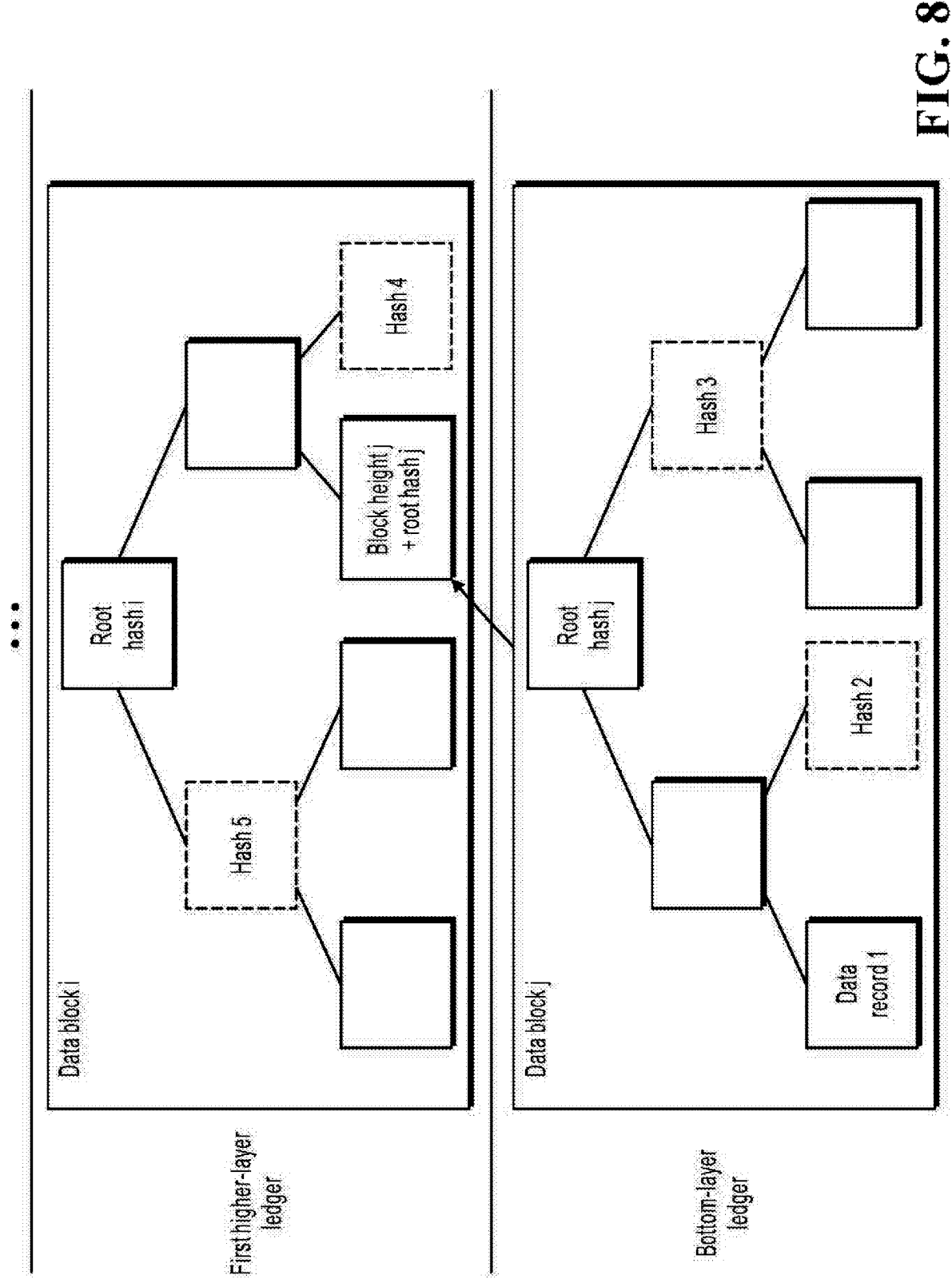
FIG. 8 is a schematic diagram illustrating multiple Merkel paths, according to some implementations of the present specification.

By analogy, based on a block height and a Merkel tree root hash of the data block including the data record corresponding to the hash (data1), the second higher-layer Merkel path corresponding to the second higher-layer ledger can be obtained, until the final Mth higher-layer Merkel path is obtained. FIG. 8 is a schematic diagram illustrating multiple Merkel paths, according to some implementations of the present specification.

In the schematic diagram, each higher-layer Merkel tree path is represented by using dashed boxes. In the schematic diagram, assume that a data record corresponding to a hash value entered by a user is data record 1 in data block j in a bottom-layer ledger, and the data block is associated with a data record in the ith data block in higher-layer ledger 1, so that the following can be obtained: a bottom-layer Merkel path in the bottom-layer ledger is hash2 and hash3 in the jth data block in the bottom-layer ledger; a Merkel path in the first higher-layer ledger is hash4 and hash5 in the ith data block in the higher-layer ledger; and so on.

It can be determined that, in the previously described querying process, any higher-layer ledger is associated with a previous ledger by using a Merkel tree root hash included in a data record. This association relationship can last until a certain data block in the bottom-layer ledger, and the data block is determined based on the hash value entered by the user.

In addition, it is worthwhile to note that, if a data record corresponding to any hash value generated in the previously described querying processes cannot be obtained through querying, it indicates that the data record may be changed, and therefore verification fails.

One piece of Merkel path information includes one Merkel path and a corresponding sequence number, and multiple pieces of Merkel information form the Merkel path information set.

S505. The client receives the set including the multiple pieces of Merkel path information, and sequentially verifies Merkel paths based on the block header information and sequence numbers.

The client stores the full block header information, so that the client can sequentially perform multiple times of SPV starting from the Merkel path corresponding to the bottom-layer ledger. The first time of SPV is equivalent to performing integrity verification on the data record corresponding to the hash value, and the subsequent M times of SPV are equivalent to sequentially performing integrity verification on some data blocks in the ledgers.

For example, for the simplest two-layer ledger, assume that one data block in the ledger stores n data records, integrity of one data record is verified during the first time of SPV; and then, when the second time of SPV is performed based on the first Merkel path provided by a higher-layer ledger, it is equivalent to implementing integrity verification on n data blocks (in the first higher-layer ledger, one data record corresponds to one data block in a bottom-layer ledger), that is, time complexity of integrity verification on n ledgers is log(n).

During the current integrity verification on the n data blocks, verifications needs to be performed serially, where time complexity is n. According to the method provided in this implementation of the present specification, time complexity of ledger verification can be reduced from n, and for the server including the M higher-layer ledgers, time complexity of verification is reduced from n to $$\underline{\log \log \ldots \ldots \log(n)}_{M}.$$

According to the solutions provided in this implementation of the present specification, data is stored by using the multi-layer blockchain-type ledger. The bottom-layer ledger is a conventional ledger, and the higher-layer ledger stores data records each including a block height of a data block and a Merkel tree root hash of data records, so that one data block in the higher-layer ledger includes a large amount of information about the bottom-layer ledger. The higher-layer ledger is used for storage and verification, so that an information capacity of the data block in the ledger can be improved, and verification efficiency can be improved during verification.

Figure 6:
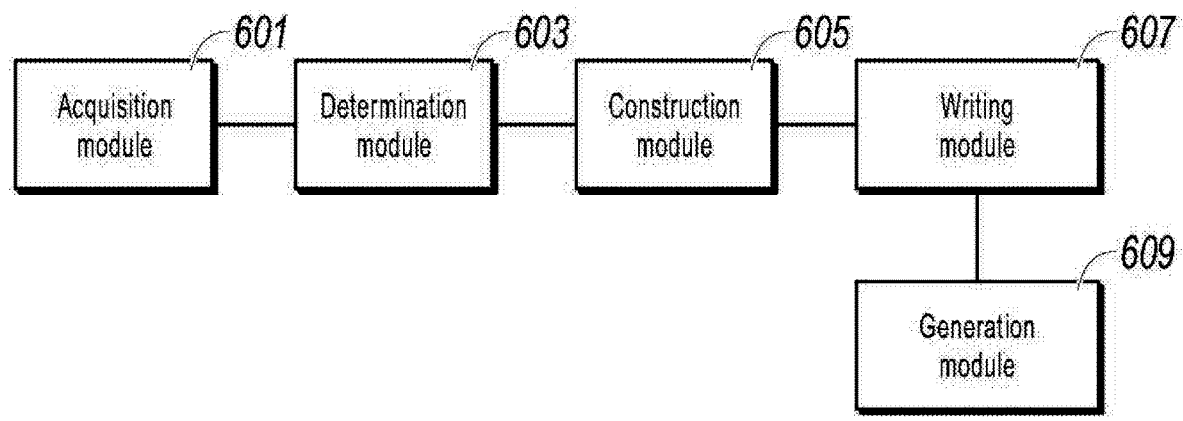
FIG. 6 is a schematic structural diagram illustrating a data storage apparatus, according to some implementations of the present specification.

Correspondingly, some implementations of the present specification further provide a data storage apparatus for a multi-layer blockchain-type ledger, where the apparatus is applied to a server that stores data by using one bottom-layer ledger and M higher-layer ledgers, both the bottom-layer ledger and the higher-layer ledger are blockchain-type ledgers, and M is a natural number. FIG. 6 is a schematic structural diagram illustrating a data storage apparatus, according to some implementations of the present specification. For the Kth higher-layer ledger (1≤K≤M), the apparatus includes: acquisition module 601, configured to obtain any data block in a previous ledger, where the previous ledger is the bottom-layer ledger when K=1, or the previous ledger is the (K−1)th higher-layer ledger when K>1; determining module 603, configured to determine a block height of the data block, and determine a root hash of a Merkel tree including data records in the data block; construction module 605, configured to construct another data record including the root hash and the block height; and writing module 607, configured to write the another data record in a data block in the Kth higher-layer ledger.

Further, in the apparatus, the blockchain-type ledger includes a blockchain ledger or a centralized storage blockchain-type ledger, and the apparatus further includes generation module 609 for generating the centralized storage blockchain-type ledger, configured to: receive data records to be stored, and determine hash values of the data records, where the data records include specified identification fields; and when a predetermined block generation condition is reached, determine data records to be written in a data block, and generate the Nth data block including a hash value of the data block and the data records, which specifically includes: when N=1, a hash value and a block height of an initial data block are given based on a predetermined way; or when N>1, a root hash of a Merkel tree including the data records to be written in the data block is determined based on hash values of the data records, the data records are written in a block body of the data block, and the root hash is written in a block header of the data block, where a block height of the data block monotonically increases based on a sequence of block generation times.

Further, the predetermined block generation condition includes: a quantity of data records to be stored reaches a quantity threshold; or a time interval from the last block generation time reaches a time threshold.

Correspondingly, some implementations of the present specification further provide a data verification system based on the previously described multi-layer blockchain-type ledger, where the system includes a client and a server, the server stores data by using one bottom-layer ledger and M higher-layer ledgers, both the bottom-layer ledger and the higher-layer ledger are blockchain-type ledgers, the client stores block header information in the blockchain-type ledgers, M is a natural number, and in the system: the client sends a verification instruction that includes a hash value of a data record to the server; the server determines, based on the hash value, a Merkel path that needs to be provided by each ledger during verification, and generates a set including multiple pieces of Merkel path information, where each piece of Merkel path information includes a Merkel path provided by one ledger and a sequence number of the ledger; and the client receives the set including the multiple pieces of Merkel path information, and sequentially verifies Merkel paths based on the block header information and sequence numbers.

Further, in the system, for the bottom-layer ledger, the server obtains the data record corresponding to the hash value from the bottom-layer ledger through querying, determines a block height of a data block including the data record, and obtains a bottom-layer Merkel path required for verifying the data record; and for the Kth higher-layer ledger, the server obtains a Merkel tree root hash and a block height of a data block including a data record related to the hash value in a previous ledger, generates another hash value based on the Merkel tree root hash and the block height, queries the Kth higher-layer ledger to obtain another data record corresponding to the another hash value, determines a data block including the another data record, and determines the Kth higher-layer Merkel path corresponding to the another data record from the data block including the another data record, where 1≤K≤M; and the previous ledger is the bottom-layer ledger when K=1, or the previous ledger is the (K−1)th higher-layer ledger when K>1.

Some implementations of the present specification further provide a computer device. The computer device includes at least a memory, a processor, and a computer program that is stored in the memory and that can run on the processor. The processor performs the data storage method shown in FIG. 2 when executing the program.

Figure 7:
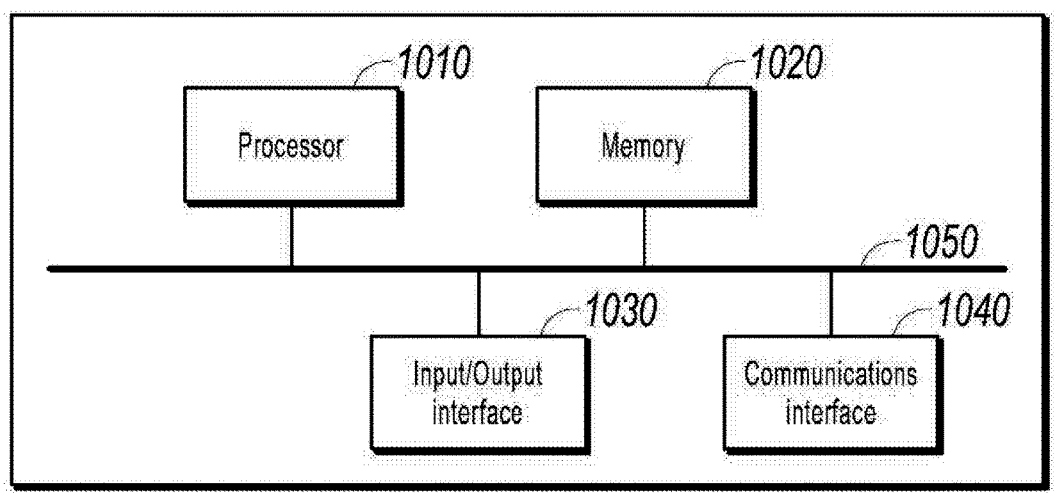
FIG. 7 is a schematic diagram illustrating a hardware structure of a computing device adapted to the implementations of the present specification.

FIG. 7 is a more detailed schematic diagram illustrating a hardware structure of a computing device, according to some implementations of the present specification. The device can include processor 1010, memory 1020, input/output interface 1030, communications interface 1040, and bus 1050. Processor 1010, memory 1020, input/output interface 1030, and communications interface 1040 are communicatively connected to each other inside the device by using bus 1050.

Processor 1010 can be implemented by using a general central processing unit (CPU), a microprocessor, an application-specific integrated circuit (ASIC), one or more integrated circuits, etc., and is configured to execute a related program, to implement the technical solutions provided in the implementations of the present specification.

Memory 1020 can be implemented by using a read-only memory (ROM), a random access memory (RAM), a static storage device, a dynamic storage device, etc. Memory 1020 can store an operating system and another application program. When the technical solutions provided in the implementations of the present specification are implemented by using software or firmware, related program code is stored in memory 1020, and is invoked and executed by processor 1010.

Input/output interface 1030 is configured to be connected to an input/output module, to input or output information. The input/output module (not shown in the figure) can be configured in the device as a component, or can be externally connected to the device, to provide a corresponding function. The input module can include a keyboard, a mouse, a touchscreen, a microphone, various sensors, etc. The output module can include a monitor, a speaker, an oscillator, an indicator, etc.

Communications interface 1040 is configured to be connected to a communications module (not shown in the figure), to implement communication interaction between the device and another device. The communications module can implement communication in a wired way (for example, by using USB or a network cable), or can implement communication in a wireless way (for example, by using a mobile network, Wi-Fi, or Bluetooth).

Bus 1050 includes a channel for transmitting information between components (for example, processor 1010, memory 1020, input/output interface 1030, and communications interface 1040) of the device.

It is worthwhile to note that although only processor 1010, memory 1020, input/output interface 1030, communications interface 1040, and bus 1050 of the device are shown, during specific implementation, the device can further include other components required for normal running. In addition, a person skilled in the art can understand that the device can include only components necessary for implementing the solutions in the implementations of the present specification, but does not necessarily include all components shown in the figure.

Some implementations of the present specification further provide a computer readable storage medium. The computer readable storage medium stores a computer program, and the data storage method shown in FIG. 2 is implemented when the program is executed by a processor.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change RAM (PRAM), a static RAM (SRAM), a dynamic RAM (DRAM), a RAM of another type, a ROM, an electrically erasable programmable read only memory (EEPROM), a flash memory or another memory technology, a compact disc read-only memory (CD-ROM), a digital versatile disc (DVD) or another optical storage, a cassette, a cassette magnetic disk storage, or another magnetic storage device, or any other non-transmission medium. The computer storage medium can be configured to store information that can be accessed by a computing device. As defined in the present specification, the computer readable medium does not include computer readable transitory media such as a modulated data signal and a carrier.

It can be determined from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be specifically implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an email sending/receiving device, a game console, a tablet computer, a wearable device, or any combination of these devices.

The implementations of the present specification are described in a progressive way. For same or similar parts of the implementations, mutual references can be made to the implementations. Each implementation focuses on a difference from other implementations. Particularly, a device implementation is similar to a method implementation, and therefore is described briefly. For a related part, references can be made to some descriptions in the method implementation. The previously described apparatus implementations are merely examples. The modules described as separate parts may or may not be physically separate. During implementation of the solutions in the implementations of the present specification, functions of the modules can be implemented in one or more pieces of software and/or hardware. Some or all of the modules can be selected based on an actual demand to implement the objective of the solutions of the implementations. A person of ordinary skill in the art can understand and implement the implementations of the present specification without creative efforts.

The previous descriptions are merely specific implementations of the implementations of the present specification. It is worthwhile to note that a person of ordinary skill in the art can further make improvements or polishing without departing from the principle of the implementations of the present specification, and the improvements or polishing shall fall within the protection scope of the implementations of the present specification.

What is claimed is:

1. A computer-implemented method for data storage, comprising:
   obtaining a data block from a previous blockchain-type ledger in multi-layer blockchain-type ledgers, wherein the multi-layer blockchain-type ledgers comprise a bottom-layer blockchain-type ledger and at least one higher-layer blockchain-type ledger;
   determining a block height of the data block and a root hash of a Merkle tree constructed by data records in the data block;
   constructing updated data records comprising the root hash and the block height;
   recording the updated data records in a data block in a current blockchain-type ledger in the multi-layer blockchain-type ledgers at a layer higher than the previous blockchain-type ledger, wherein each data block of each higher-layer blockchain-type ledger comprises, for each of multiple lower-layer data blocks of a respective previous blockchain-type ledger, a respective root hash and a respective block height for the lower-layer data block;
   receiving, from a client device, one or more hash values for verifying one or more data records;
   determining one or more Merkle paths of a particular Merkle tree associated with the one or more data records based on the one or more hash values, wherein each Merkle path corresponds to a respective blockchain-type ledger of the multi-layer blockchain-type ledgers and includes an identifier of the respective blockchain-type ledger; and sending information of the one or more Merkle paths to the client device.

2. The computer-implemented method of claim 1, wherein:

the multi-layer blockchain-type ledgers comprise one or more of distributed stored ledgers or centrally stored ledgers; and each new data block in the multi-layer blockchain-type ledgers is generated by performing operations comprising:

receiving new data records to be stored;

determining that a predetermined condition for generating a new data block is satisfied; and generating the new data block that includes at least a portion of the new data records.

3. The computer-implemented method of claim 2, wherein the new data block is a first data block of a blockchain-type ledger of the multi-layer blockchain-type ledgers, the new data block further includes one or more predetermined hash values and has a predetermined block-height.

4. The computer-implemented method of claim 2, wherein the new data block is not a first data block of a blockchain-type ledger of the multi-layer blockchain-type ledgers, the new data block further includes a block header and a block body, the at least a portion of the new data records are stored in the block body as a new Merkle tree, and a root hash of the new Merkle tree calculated based on hash values of the at least a portion of the new data records is stored in the block header.

5. The computer-implemented method of claim 2, wherein the predetermined condition is one of a volume of the data records reaches a predetermined threshold and a last data block has been generated for a predetermined time.

6. The computer-implemented method of claim 1, wherein determining a Merkle path of the one or more Merkle paths that corresponds to the bottom-layer blockchain-type ledger comprises:

identifying a particular data record corresponding to a hash value of the one or more hash values from the bottom-layer blockchain-type ledger; and determining a block height of a particular data block that includes the particular data record corresponding to the hash value.

7. The computer-implemented method of claim 1, wherein determining a Merkle path of the one or more Merkle paths that corresponds to a higher-layer blockchain-type ledger comprises:

identifying a first data record corresponding to a first hash value of the one or more hash values from a particular previous blockchain-type ledger;

determining a first root hash of a first Merkle tree that includes the first data record corresponding to the first hash value;

determining a first block height of a first data block that includes the first data record corresponding to the first hash value;

generating a second hash value based on the first root hash and the first block height;

identifying a second data record corresponding to the second hash value from the higher-layer blockchain-type ledger; and determining the Merkle path based on a second data block that includes the second data record.

8. A computer-implemented system for data storage, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining a data block from a previous blockchain-type ledger in multi-layer blockchain-type ledgers, wherein the multi-layer blockchain-type ledgers comprise a bottom-layer blockchain-type ledger and at least one higher-layer blockchain-type ledger;

determining a block height of the data block and a root hash of a Merkle tree constructed by data records in the data block;

constructing updated data records comprising the root hash and the block height;

recording the updated data records in a data block in a current blockchain-type ledger in the multi-layer blockchain-type ledgers at a layer higher than the previous blockchain-type ledger, wherein each data block of each higher-layer blockchain-type ledger comprises, for each of multiple lower-layer data blocks of a respective previous blockchain-type ledger, a respective root hash and a respective block height for the lower-layer data block;

receiving, from a client device, one or more hash values for verifying one or more data records;

determining one or more Merkle paths of a particular Merkle tree associated with the one or more data records based on the one or more hash values, wherein each Merkle path corresponds to a respective blockchain-type ledger of the multi-layer blockchain-type ledgers and includes an identifier of the respective blockchain-type ledger; and sending information of the one or more Merkle paths to the client device.

9. The computer-implemented system of claim 8, wherein:

the multi-layer blockchain-type ledgers comprise one or more of distributed stored ledgers or centrally stored ledgers; and each new data block in the multi-layer blockchain-type ledgers is generated by performing operations comprising:

receiving new data records to be stored;

determining that a predetermined condition for generating a new data block is satisfied; and generating the new data block that includes at least a portion of the new data records.

10. The computer-implemented system of claim 9, wherein the new data block is a first data block of a blockchain-type ledger of the multi-layer blockchain-type ledgers, the new data block further includes one or more predetermined hash values and has a predetermined block-height.

11. The computer-implemented system of claim 9, wherein the new data block is not a first data block of a blockchain-type ledger of the multi-layer blockchain-type ledgers, the new data block further includes a block header and a block body, the at least a portion of the new data records are stored in the block body as a new Merkle tree, and a root hash of the new Merkle tree calculated based on hash values of the at least a portion of the new data records is stored in the block header.

12. The computer-implemented system of claim 9, wherein the predetermined condition is one of a volume of the data records reaches a predetermined threshold and a last data block has been generated for a predetermined time.

13. The computer-implemented system of claim 8, wherein wherein determining a Merkle path of the one or more Merkle paths that corresponds to the bottom-layer blockchain-type ledger comprises:
identifying a particular data record corresponding to a hash value of the one or more hash values from the bottom-layer blockchain-type ledger; and
determining a block height of a particular data block that includes the particular data record corresponding to the hash value.

14. The computer-implemented system of claim 8, wherein determining a Merkle path of the one or more Merkle paths that corresponds to a higher-layer blockchain-type ledger comprises:
identifying a first data record corresponding to a first hash value of the one or more hash values from a particular previous blockchain-type ledger;
determining a first root hash of a first Merkle tree that includes the first data record corresponding to the first hash value;
determining a first block height of a first data block that includes the first data record corresponding to the first hash value;
generating a second hash value based on the first root hash and the first block height;
identifying a second data record corresponding to the second hash value from the higher-layer blockchain-type ledger; and
determining the Merkle path based on a second data block that includes the second data record.

15. A non-transitory, computer-readable medium storing one or more instructions executable by a computer-implemented system to perform one or more operations for data storage comprising:
obtaining a data block from a previous blockchain-type ledger in multi-layer blockchain-type ledgers, wherein the multi-layer blockchain-type ledgers comprise a bottom-layer blockchain-type ledger and at least one higher-layer blockchain-type ledger;
determining a block height of the data block and a root hash of a Merkle tree constructed by data records in the data block;
constructing updated data records comprising the root hash and the block height;
recording the updated data records in a data block in a current blockchain-type ledger in the multi-layer blockchain-type ledgers a layer higher than the previous blockchain-type ledger, wherein each data block of each higher-layer blockchain-type ledger comprises, for each of multiple lower-layer data blocks of a respective previous blockchain-type ledger, a respective root hash and a respective block height for the lower-layer data block;
receiving, from a client device, one or more hash values for verifying one or more data records;
determining one or more Merkle paths of a particular Merkle tree associated with the one or more data records based on the one or more hash values, wherein each Merkle path corresponds to a respective blockchain-type ledger of the multi-layer blockchain-type ledgers and includes an identifier of the respective blockchain-type ledger; and
sending information of the one or more Merkle paths to the client device.

16. The non-transitory, computer-readable medium of claim 15, wherein:
the multi-layer blockchain-type ledgers comprise one or more of distributed stored ledgers or centrally stored ledgers; and
each new data block in the multi-layer blockchain-type ledgers is generated by performing operations comprising:
receiving new data records to be stored;
determining that a predetermined condition for generating a new data block is satisfied; and
generating the new data block that includes at least a portion of the new data records.

17. The non-transitory, computer-readable medium of claim 16, wherein the new data block is a first data block of a blockchain-type ledger of the multi-layer blockchain-type ledgers, the new data block further includes one or more predetermined hash values and has a predetermined block-height.

18. The non-transitory, computer-readable medium of claim 16, wherein the new data block is not a first data block of a blockchain-type ledger of the multi-layer blockchain-type ledgers, the new data block further includes a block header and a block body, the at least a portion of the new data records are stored in the block body as a new Merkle tree, and a root hash of the new Merkle tree calculated based on hash values of the at least a portion of the new data records is stored in the block header.

19. The non-transitory, computer-readable medium of claim 16, wherein the predetermined condition is one of a volume of the data records reaches a predetermined threshold and a last data block has been generated for a predetermined time.

20. The non-transitory, computer-readable medium of claim 15, wherein determining a Merkle path of the one or more Merkle paths that corresponds to the bottom-layer blockchain-type ledger comprises:
identifying a particular data record corresponding to a hash value of the one or more hash values from the bottom-layer blockchain-type ledger; and
determining a block height of a particular data block that includes the particular data record corresponding to the hash value.

21. The non-transitory, computer-readable medium of claim 15, wherein determining a Merkle path of the one or more Merkle paths that corresponds to a higher-layer blockchain-type ledger comprises:
identifying a first data record corresponding to a first hash value of the one or more hash values from a particular previous blockchain-type ledger;
determining a first root hash of a first Merkle tree that includes the first data record corresponding to the first hash value;
determining a first block height of a first data block that includes the first data record corresponding to the first hash value;
generating a second hash value based on the first root hash and the first block height;
identifying a second data record corresponding to the second hash value from the higher-layer blockchain-type ledger; and
determining the Merkle path based on a second data block that includes the second data record.

* * * * *

UNITED STATES PATENT AND TRADEMARK OFFICE
CERTIFICATE OF CORRECTION

PATENT NO. : 10,949,118 B2  
APPLICATION NO. : 16/810691  
DATED : March 16, 2021  
INVENTOR(S) : Xinying Yang and Benquan Yu Page 1 of 1

It is certified that error appears in the above-identified patent and that said Letters Patent is hereby corrected as shown below:

On the Title Page

Item (71), Under Applicant, Delete "Alibaba Group Holding Limited, George Town (KY)" and insert -- Advanced New Technologies Co., Ltd., Grand Cayman (KY) --, therefor.

In the Claims

Column 15/Line 8, In Claim 13, delete "wherein wherein" and insert -- wherein --, therefor.

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*